(12) United States Patent
Bigwood et al.

(10) Patent No.: US 6,668,579 B1
(45) Date of Patent: Dec. 30, 2003

(54) CONTAINER WITH REFILLABLE CORE

(75) Inventors: Michael Colby Bigwood, New York, NY (US); Mark D. Morrison, New York, NY (US)

(73) Assignee: MPDI, New York, NY (US)

( * ) Notice: Subject to any disclaimer, the term of this patent is extended or adjusted under 35 U.S.C. 154(b) by 0 days.

(21) Appl. No.: 10/164,675

(22) Filed: Jun. 6, 2002

(51) Int. Cl.[7] .................................................. F25D 3/08
(52) U.S. Cl. ........................ 62/457.6; 62/457.2; 62/530
(58) Field of Search .............................. 62/457.3, 457.4, 62/457.6, 371, 530

(56) References Cited

U.S. PATENT DOCUMENTS

| 3,413,820 | A | * | 12/1968 | Paquin ........................ 62/371 |
| 4,306,424 | A | * | 12/1981 | Chavoor ..................... 62/457 |
| 4,981,234 | A | * | 1/1991 | Slaughter ..................... 220/415 |
| 5,231,850 | A | * | 8/1993 | Morris ....................... 62/457.6 |
| 5,345,784 | A | * | 9/1994 | Bazemore et al. ............ 62/371 |
| 6,101,974 | A | * | 8/2000 | Frohlich .................... 119/51.5 |

* cited by examiner

Primary Examiner—Melvin Jones
(74) Attorney, Agent, or Firm—Hayes Soloway P.C.

(57) ABSTRACT

A doubled wall container is disclosed having a fill cap that allows a user to alternately add or remove a liquid from an interior volume formed between the walls of the container.

12 Claims, 2 Drawing Sheets

CONTAINER WITH REFILLABLE CORE

FIELD OF THE INVENTION

The present invention relates to portable containers and more particularly to a container with a refillable liquid core.

BACKGROUND OF THE INVENTION

Insulated coolers are known in the art. These coolers typically have spaced inner and outer walls made of a high strength plastic or metal and include a removable cover. The space between the walls is typically filled with an insulating material such as polystyrene. A drawback to this type of cooler is that a user must insert ice or a cold pack in the container to keep items cold. The ice and cold packs take up valuable volume within the container and the melted water from the ice can damage items in the container.

Insulated drinking cups are known in the art. These cups typically hold 8–32 oz of liquid and have a handle for grasping. These cups have spaced inner and outer walls. The space between the walls may be filled with an insulating material or a liquid. The liquid is installed by the manufacture and sealed to prevent spillage. The user cannot change the quantity of liquid. The entire volume between the inner and outer walls may not be completely occupied by the liquid so as to allow for a change in volume of the liquid as its temperature changes. A drawback to this type of cup is that the liquid cannot be removed and hence the weight of the cup cannot be lessened to make it easier for a user to transport or a manufacture to ship. This becomes more important as the size of the drinking cup increases. Another drawback is that these cups do not have a cover that would prevent heat loss. A sealed core may also present a problem if the user wishes to heat the liquid in a microwave or similar oven.

What is needed is a container having a space between an inner and outer core that can be filled with a removable thermal mass, preferably a readily available liquid such as water.

SUMMARY OF THE INVENTION

The invention is directed to a portable container for keeping items cold or hot. In one embodiment the invention provides a container having an inner and outer core with a space between that can be filled with a liquid. The liquid may chilled or frozen or alternatively heated prior to use. The container also having a user removable seal to allow for removal of the liquid to reduce the container weight when not in use. The cooled liquid thereafter helping to keep items in the container cool and the heated liquid helping to keep items in the container warm for an extended period of time.

The above and other objects, features, and advantages of the present invention will be apparent in the following detailed description thereof when read in conjunction with the appended drawings wherein the same reference numerals denote the same or similar parts throughout the several views.

DETAILED DESCRIPTION OF THE INVENTION

Figure 1:
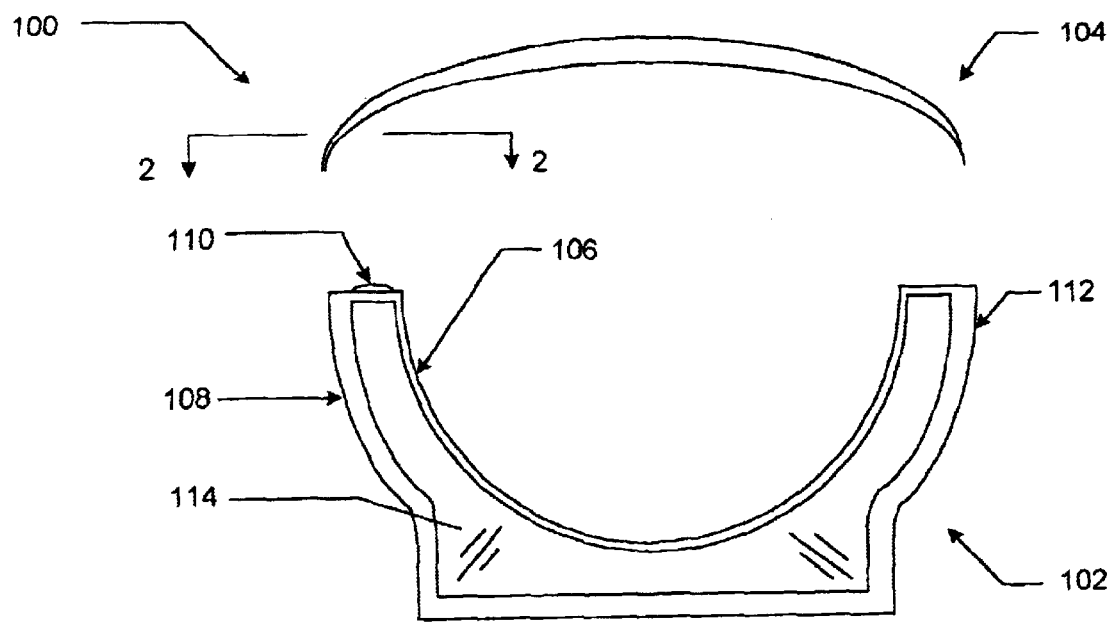
FIG. 1 is a section view of a first exemplary container consistent with the present invention.
Figure 2:
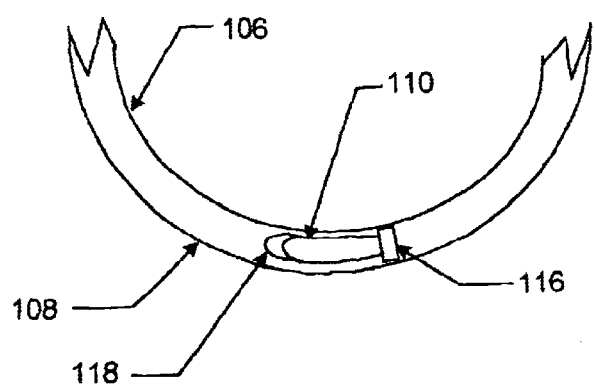
FIG. 2 is a partial top view of the container of FIG. 1 taken through line 2—2.

FIG. 1 shows a container 100 for holding items to be kept cold or hot. The container includes a bowl 102 and a cover 104. The cover 104 may be removably securable to an upper lip of the bowl 102. The bowl 102 and the cover 104 may be made from a polymeric material, including but not limited to, polyethylene, polypropylene, polycarbonate, PVC, polyester, and ABS. The bowl material is preferably translucent, and more preferably transparent.

The bowl 102 may have an inner wall 106 spaced from an outer wall 108. A volume 114 between the inner wall 106 and the outer wall 108 may be filled with a liquid, preferably water. The bowl 102 may be formed as one piece by roto or blow molding or as two separate pieces by injection molding and then joined using ultrasonic welding. The inner wall 106 may be formed thinner than the outer wall 108 to allow better heat transfer towards the item stored within the container. The surface of the outer wall 108 may include a texture so the bowl feels less cold or less hot to the touch. Alternatively, a coating may be applied to the outer surface to insulate.

An opening to the volume 114 may provide an entry/exit port for filling or draining and may be closed by a fill cap 110. The fill cap 110 may be coupled to the bowl by a hinge 116 or a retainer (not shown) that extends into the opening. The fill cap 110 may be located any where on the bowl, but is preferred on a lip parallel to the base. A recess 118 in proximity to the fill cap 110 may be provided to allow a user to more easily grasp the fill cap 110. The fill cap 110 can be removed to allow the liquid to be heated, preferably by a microwave.

An indicia 112 may be provided on either the inner or outer wall to signal the user the suggested or maximum volume of liquid to be added. Alternatively, the location of the opening may be situated on the bowl to prevent the volume 114 from being completely filled. Alternatively, a float may be inserted in the volume 114 to help indicate the liquid level.

The container may be made in any shape including, but not limited to circular and rectangular. The volume of the bowl itself may be as small as a few ounces to as large as a few gallons. The bowl may also include a pair of handles for grasping.

Figure 3:
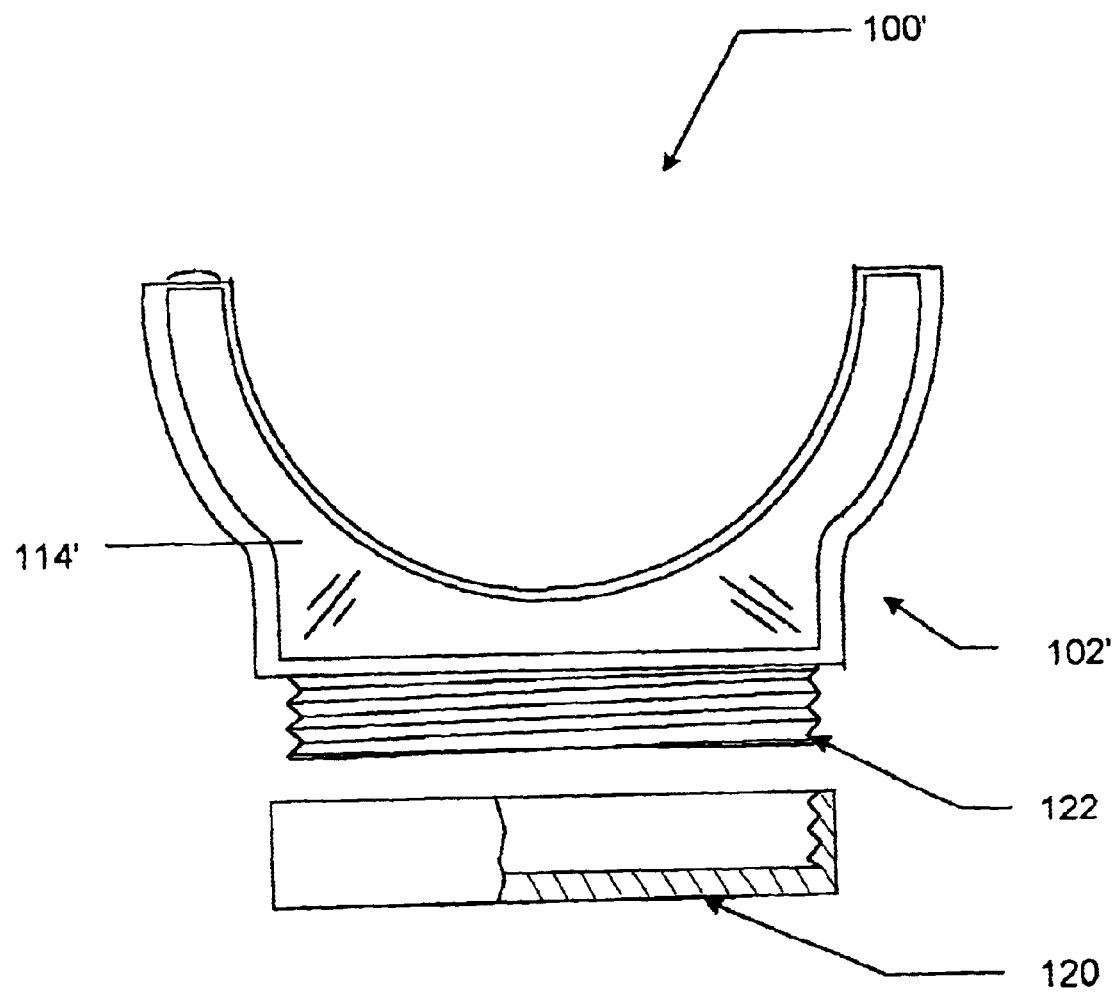
FIG. 3 is a partial section view of a second exemplary container consistent with the present invention.

FIG. 3 shows an alternative embodiment container 100'. A threaded portion 122 may be formed around the base of the container 100' and a lid 120 having cooperating threads may be coupleable to the base. Alternatively, the lid may be securable to the base without threads. The user may remove the lid 120 to fill or drain liquid from the volume 114'.

It should be understood that various features and options disclosed may be combined and are within the scope of the present invention. The bowl of the present invention may be used for humans or for pets.

It should be understood that, while the present invention has been described in detail herein, the invention can be embodied otherwise without departing from the principles thereof, and such other embodiments are meant to come within the scope of the present invention as defined in the following claim(s)

We claim:

1. A bowl, comprising:
   an inner wall;
   an outer wall;
   an interior volume located between the inner wall and the outer wall; and a removable fill cap for providing liquid access to the interior volume, wherein the fill cap is hingeably secured to the bowl.

2. The bowl of claim 1, further comprising an indicia indicative of one of a maximum volume and a suggested volume of liquid to be added to the interior volume.

3. The bowl of claim 1, wherein the inner wall is thinner than the outer wall.

4. A bowl, comprising:

an inner wall;

an outer wall; an interior volume located between the inner wall and the outer wall; and a user removable fill cap for providing liquid access to the interior volume, wherein the fill cap is hingeably secured to the bowl.

5. A bowl, comprising:

an inner wall;

an outer wall;

an interior volume located between the inner wall and the outer wall;

a user removable fill cap for providing liquid access to the interior volume; and an indicia indicative of one of a maximum volume and a suggested volume of liquid to be added to the interior volume.

6. A bowl, comprising:

an inner wall;

an outer wall;

an interior volume located between the inner wall and the outer wall; and a user removable fill cap for providing liquid access to the interior volume, wherein the inner wall is thinner than the outer wall.

7. A bowl, comprising:

an inner wall;

an outer wall;

an interior volume located between the inner wall and the outer wall; and a user removable fill cap for providing liquid access to the interior volume, wherein the outer wall comprises one of a texture to reduce the perceived temperature of the outer wall and an insulating coating.

8. A bowl, comprising:

an inner wall;

an outer wall;

an interior volume located between the inner wall and the outer wall; and a user removable fill cap for providing liquid access to the interior volume, wherein the bowl comprises a microwaveable polymeric material.

9. A bowl, comprising:

an inner wall;

an outer wall;

an interior volume located between the inner wall and the outer wall;

a threadably removable fill cap for providing liquid access to the interior volume; and an indicia indicative of one of a maximum volume and a suggested volume of liquid to be added to the interior volume.

10. A bowl, comprising:

an inner wall;

an outer wall;

an interior volume located between the inner wall and the outer wall; and a threadably removable fill cap for providing liquid access to the interior volume, wherein the inner wall is thinner than the outer wall.

11. A bowl, comprising:

an inner wall;

an outer wall;

an interior volume located between the inner wall and the outer wall; and a threadably removable fill cap for providing liquid access to the interior volume, wherein the outer wall comprises one of a texture to reduce a perceived temperature of the outer wall and an insulating coating.

12. A bowl, comprising:

an inner wall;

an outer wall;

an interior volume located between the inner wall and the outer wall; and a threadably removable fill cap for providing liquid access to the interior volume, wherein the bowl comprises a microwaveable polymeric material.

* * * * *